June 4, 1929.  H. W. FAUVER  1,716,219
GLASS RUN CHANNEL
Filed March 10, 1927
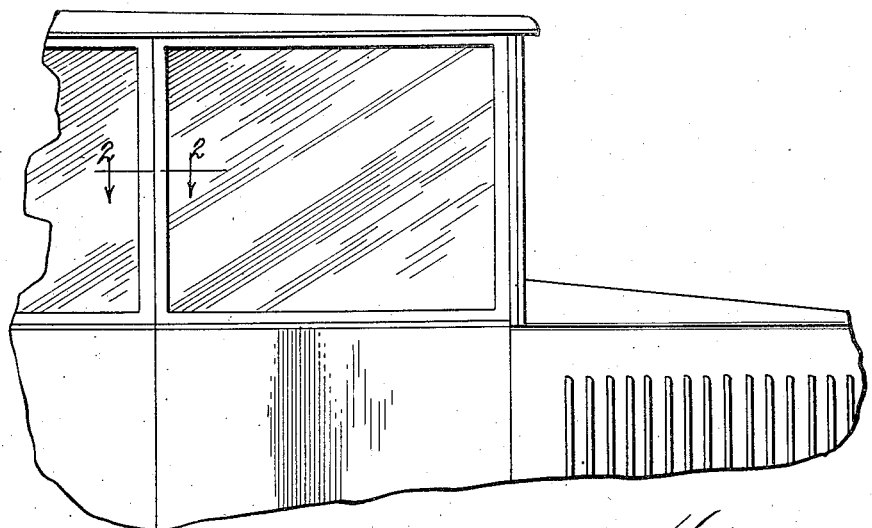
Fig. 1
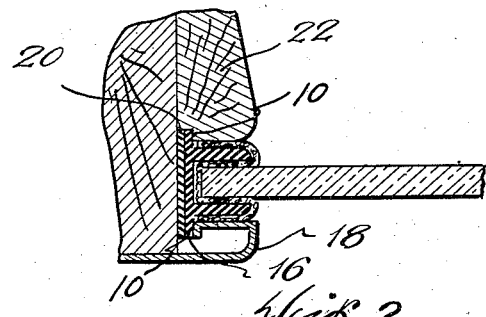
Fig. 2
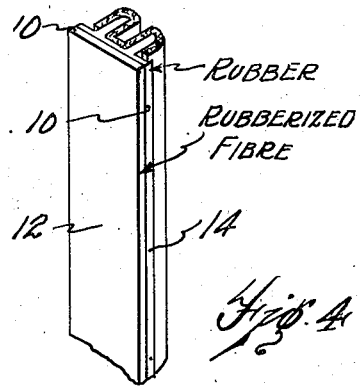
Fig. 4
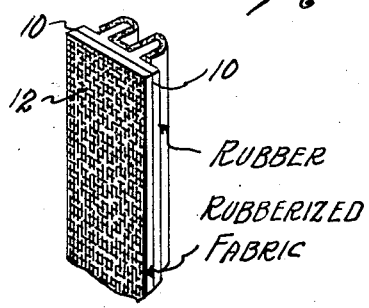
Fig. 3
Fig. 5
INVENTOR.
HARRY W. FAUVER
BY
Parker and Burton,
ATTORNEYS.

Patented June 4, 1929.

UNITED STATES PATENT OFFICE.

HARRY W. FAUVER, OF DETROIT, MICHIGAN.

GLASS-RUN CHANNEL.

Application filed March 10, 1927. Serial No. 174,135.

My invention relates to an improved glass run channel or window runway and particularly one of the type such as is illustrated in U. S. Patent to Simpson, No. 1,463,444.

Runways of the type specified are commonly employed to serve as guides for the slidable, frameless glass panes in closed automobile bodies. The object is to provide a window runway of the character described comprising a rubber channel body having a friction reducing covering extending over the glass engaging surface and outwardly over the exposed surface thereof, and having a back or base so formed that the runway will possess sufficient inherent lateral rigidity to insure ready installation within a provided channel in the stationary window frame and prevent displacement or distortion thereof when in use.

Other objects, advantages and meritorious features of my invention will more fully appear from the following specification, accompanying drawing, and appended claims.

In the drawing:

Fig. 1 is a fragmentary elevation of a vehicle body provided with my improved runway.

Fig. 2 is a cross-sectional view taken on line 2—2 of Fig. 1.

Figs. 3 and 4 are perspectives of modified forms of my invention.

Fig. 5 is a cross-section view of my invention embodied in a runway of a different cross-section from that shown in Figs. 3 and 4.

In Fig. 1 my invention is shown in use. It is common practice to provide closed automobile bodies with slidable, frameless glass windows mounted in suitable guides to be raised or lowered. The type of runway illustrated in the Simpson patent above referred to has come into substantially universal use. It comprises a rubber channel body approximately rectangular in cross-section and provided with a friction reducing fabric covering material extending over the glass engaging surface of the channel and outwardly over the outer surface to a point of concealment between the frame and the side walls of the channel. My invention relates to an improved channel of this type.

In Figs. 2, 3 and 4 I have shown a channel which has a base that projects outwardly, laterally, beyond each side wall, forming a lateral base flange 10 which is received, as shown in Fig. 2, on one side within a recess 16 formed in the frame post 18, and on the other side within a recess 20 formed in the window stop 22. In Fig. 5 I have shown a window channel which does not possess such a flanged base but which otherwise is identical with the channels shown in Figs. 2, 3 and 4.

My invention consists in providing such a channel with a base comprising, in part at least, a laterally extending portion 12 formed of material possessing substantially greater lateral rigidity than the material of which the side walls of the channel are formed. In Fig. 3 I have shown this base as provided with an outer layer of heavy reinforcing fabric which imparts lateral rigidity to the runway structure.

In Fig. 4 I have shown the base as formed in part of the same material of which the side walls are formed as at 14 which is true also of the structure shown in Fig. 3, and in part of a superimposed layer of fibrous rubber composition secured integrally thereto, which rubber composition possesses substantially greater lateral rigidity than the rubber of which the remaining portion of the base is composed.

In Fig. 5 I have shown the base formed in the same manner as shown in Fig. 4 and as hereinabove described except that the base is not provided with the lateral projecting flanges 10 shown in Fig. 4.

My runway is particularly adapted for easy and rapid installation into a support of the character shown in Fig. 2 by being inserted longitudinally slidably therein from one end of the support and the laterally stiffened flanges travel readily through the recesses within which they are received to facilitate the installation of the strip and to fold the strip securely in place.

What I claim is:

1. The combination with a slidable window pane and a frame of a runway for the pane carried by the frame comprising a rubber channel body the base and side walls of which are formed of soft homogeneous rubber material and provided with a friction reducing covering material extending over the glass-engaging surfaces thereof downwardly along the outer sides of the walls, said base projecting laterally on both sides beyond the side walls, and a superimposed layer of fibrous rubber material substantially more stiff than the material of which the channel body is formed permanently secured to the back of the channel body and extending beyond the side walls thereof for the full width of the base stiffening the base and lending rigidity to the laterally projecting portions thereof.

2. A flexible runway of molded and unitary construction for slidable windows, having a body portion, in combination with side walls projecting from said body portion, arranged and adapted to contact with opposite sides of a slidable window, and a relatively stiff self-supporting base of open mesh fabric permanently secured beneath the under surface of said body portion.

In testimony whereof, I, HARRY W. FAUVER, sign this specification.

HARRY W. FAUVER.